US008213874B2

(12) United States Patent
Agnew

(10) Patent No.: US 8,213,874 B2
(45) Date of Patent: Jul. 3, 2012

(54) SYSTEM AND METHOD FOR DYNAMIC FREQUENCY ASSIGNMENT

(75) Inventor: Carson E. Agnew, Vienna, VA (US)

(73) Assignee: Progeny LMS, LLC, Alexandria, VA (US)

(*) Notice: Subject to any disclaimer, the term of this patent is extended or adjusted under 35 U.S.C. 154(b) by 542 days.

(21) Appl. No.: 12/419,170

(22) Filed: Apr. 6, 2009

(65) Prior Publication Data

US 2010/0255794 A1 Oct. 7, 2010

(51) Int. Cl.
*H04B 1/00* (2006.01)
*H04J 1/16* (2006.01)
(52) U.S. Cl. ............... 455/67.13; 370/252; 370/310
(58) Field of Classification Search .......... 455/63.1, 455/500, 501, 507, 509, 511, 67.11, 67.13; 370/252, 310
See application file for complete search history.

(56) References Cited

U.S. PATENT DOCUMENTS

| 8,107,391 | B2* | 1/2012 | Wu et al. ............... 370/252 |
| 2006/0262731 | A1 | 11/2006 | Carlson |
| 2008/0130519 | A1 | 6/2008 | Bahl |
| 2009/0117859 | A1* | 5/2009 | Smith et al. ............. 455/78 |
| 2009/0217333 | A1* | 8/2009 | Young et al. ............ 725/109 |

OTHER PUBLICATIONS

Federal Communications Commission, 47 CFR Part 15, Feb. 2009, Federal register, vol. 74 No. 30, 38 pages.*
Aardal et al., "Models and Solution Techniques for Frequency Assignment Problems", pp. 79-129, Ann. Oper. Res (2007), Springer Science+Business Media, LLC 2007.
Agnew et al., "Frequency Coordination and Spectrum Economics", pp. 167-183, Research in Law and Economics, vol. 9, by JAI Press Inc., 1986.
Agnew et al., "On Quadratic Adaptive Routing Algorithms", pp. 18-22, Communications of the ACM, vol. 19, No. 1, 1976.
Ronald Coase, "The Federal Communications Commission", pp. 1-40, Journal of Law and Economics, vol. II, Oct. 1959.
De Vany et al., "A Property System for the Market Allocation of the Electromagnetic Spectrum: A Legal-Economic-Engineering Study", pp. 1499-1561, Stanford Law Review 1968-1969.
Federal Communications Commission, "In the Matter of Unlicensed Operation in the TV Broadcast Bands, Additional Spectrum for Unlicensed Devices Below 900 MHz and in the 3 GHz Band", pp. 1-130, released Nov. 14, 2008.
Fischetti et al., "Frequency Assignment in Mobile Radio Systems Using Branch-and-Cut Techniques", pp. 241-255, European Journal of Operational Research 123 (2000).
Fred Glover, "Tabu Search: A Tutorial" pp. 74-94, Interfaces 20:4, Jul.-Aug. 1990.

(Continued)

*Primary Examiner* — Dean O Takaoka
(74) *Attorney, Agent, or Firm* — Guntin Meles & Gust, PLC; Pablo Meles

(57) ABSTRACT

White space devices are unlicensed radiofrequency devices that must have certain capabilities in order to avoid harmful interference to licensed operations. In general, they must be location-aware, must be able to contact a geolocation database and may not operate without receiving a positive control signal. A number of white space devices can use a control channel to communicate with a control station. In addition to meeting the geolocation and positive control requirements given above, the control station coordinates the channels used by the white space devices so as to minimize their aggregate interference. In one embodiment, a control channel uses a separate frequency band with high availability and reliability but low throughput. Embodiments optimize channel assignments where the potential interference depends on the mutual distances between the white space devices. Potential interference reductions of 20-30 dB have been found in simulations. Other embodiments are disclosed.

26 Claims, 5 Drawing Sheets

OTHER PUBLICATIONS

Gupta et al., "The Capacity of Wireless Networks" pp. 388-404, IEEE Transactions on Information, Mar. 2000.

Koopmans et al., "Assignment Problems and the Location of Economic Activities", pp. 53-76, Econometrica Journal of the Econometric Society, vol. 25, No. 1, Jan. 1975.

Harold W. Kuhn, "The Hungarian Method for the Assignment Problem", 83-97, Naval Research Logistics Quarterly 2 (1955).

P. Noar, "The Regulation of Queue Size by Levying Tolls", pp. 15-24, Econometrica Journal of the Econometric Society, vol. 37, No. 1, Jan. 1969.

R.S. Rappaport, "Wireless Communications: Principles and Practice", pp. 138-139, 2nd Edition, Prentice Hall, 2002.

A.A. Walters, "The Theory and Measurement of Private and Social Costs of Highway Congestion", pp. 679-699, Econometrica Journal of the Econometric Society, vol. 29, No. 4, Oct. 1961.

Patent Cooperation Treaty, International Preliminary Report on Patentability, by Authorized Officer Lingfei Bai, dated Oct. 11, 2011, Written Opinion, by Authorized Officer Blaine Copenheaver, mailed Jun. 3, 2010.

* cited by examiner

100

200

300

SYSTEM AND METHOD FOR DYNAMIC FREQUENCY ASSIGNMENT

FIELD OF THE DISCLOSURE

The present disclosure relates generally to radiofrequency spectrum allocation and more specifically to a system and method for dynamic frequency assignment.

BACKGROUND

For historical and regulatory reasons, the radio frequency spectrum is managed under two different regimes, licensed and unlicensed. In the licensed regime, a regulator such as a national authority assigns a right, generally exclusive, to an individual to operate a radio system. The assignment is typically limited in terms of the permitted time when it may be used, the permitted geographic area of operation and the permitted spectrum band. The types of limitation selected include power or EIRP within and outside the operating bandwidth, antenna height, type of modulation and so forth. The regulator chooses each assignment to prevent harmful interference to other users.

The unlicensed regime does not have exclusive assignments. Any number of users may operate any device that meets certain technical and operating restrictions in an unlicensed frequency band. The regulator sets these restrictions to minimize potential interference. Typical restrictions include:

Requirements for low transmit power or EIRP
Requirements for low duty cycle or throughput
Restrictions on mobility
Restrictions on how the devices are uses, for example, for electronic meter reading.

However, an explicit condition of unlicensed operation is that all such devices must accept any interference they receive from other unlicensed devices, even if it causes them to fail to function. Moreover, unlicensed users generally may not interfere with any licensed operation, even if they must cease transmission.

In some cases, regulators have mixed the two regimes. The so-called broadcast "white spaces" are one example that is relevant to the embodiments herein. The white spaces occur in the first place because the licensed operation, television broadcasting between 500-700 MHz, can occupy only one-third to one-half of the spectrum in any area. The rest of the spectrum was left unassigned because consumers' television receivers cannot discriminate satisfactorily between adjacent signals.

There have been proposals to use this spectrum at least since DeVany, et al. [1969] p. 1556. A recent decision by the Federal Communications Commission (FCC [2008]) has opened the white space to a form of unlicensed operation. It is the nature of unlicensed use that the FCC has placed the full burden of non-interference on the unlicensed operators. In this case, the challenge to using the white space bands is a substantial requirement to coordinate with and protect licensed users of the white space frequencies themselves or adjacent frequencies (even though use of these frequencies may be relatively minor). Specifically, so-called white space devices (WSDs) must either (a.) perform the following functions or (b.) be a client of a device that does so:

Be able to determine their position,
Consult a geolocation data base to determine which frequencies are available, and
Transmit only after they receive a "control" signal that positively identifies which frequencies are available Notice that these requirements do not address how the unlicensed devices will avoid interfering with each other. Open access to unlicensed bands by any number of users make avoiding mutual interference a significant problem.

Moreover, adopting existing techniques to avoid mutual interference leads to poor spectrum utilization. The low transmit powers, low duty cycles and other restrictions noted above necessarily reduce the overall intensity of spectrum use, measured for example as bits/sec per unit of geographic area, to a low level.

Because the service is unlicensed, it is impossible to limit the number of devices in a particular area. In general, there will be more unlicensed devices than there are channels.

DETAILED DESCRIPTION

Figure 1:
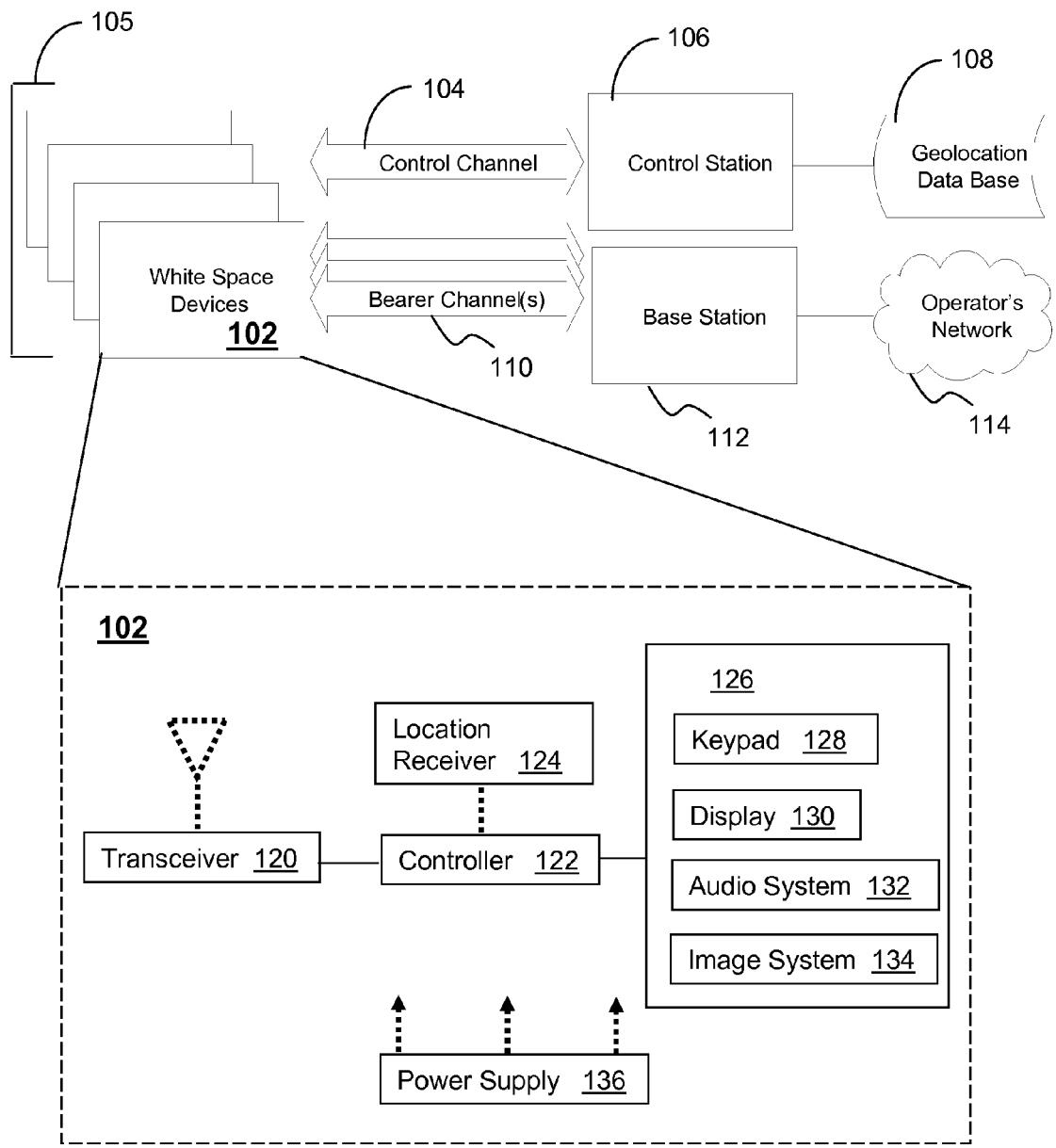
FIG. 1 depicts an illustrative embodiment of a communication system in accordance with the embodiments herein.

A list of acronyms of terms associated with the disclosed embodiments herein follows:

Acronyms

BER Bit error rate
BS Base Station
CS Control Station
EIRP Effective Emitted Radiated Power
GPS Global Positioning System
LMS Location and Monitoring Service
TDOA Time Difference of Arrival
UHF Ultra High Frequency (Refers to frequencies between 300 MHz and 1 GHz.)
WSD White Space Device One embodiment of the present disclosure can entail a white spaces device (WSD) having a controller. The controller can be programmed to or be operable to send location information (or enabled to extract location information to send) to a control station over a control channel with respect to a current location of the WSD, receive channels available based on a geolocation database, and receive a channel assignment based upon the geolocation database and a minimized interference calculation, wherein the minimized interference calculation is based on an aggregate interference that the WSD received from all other devices using the same channel within range of the WSD and the aggregate interference that the WSD causes to all other devices using the same channel within range of the WSD.

Another embodiment of the present disclosure can entail a method at a white spaces device (WSD) including the steps of sending a unique identifier for the WSD to a control station over a control channel, sending location information to the control station over the control channel with respect to a current location of the WSD, receiving channels available based on a geolocation database, and receive a channel assignment based upon the geolocation database and a minimized interference calculation.

Yet another embodiment of the present disclosure can entail a control station having a controller to locate a white spaces device (WSD) within a predetermined area, interact with a geolocation database, determine an acceptable channel assignment among a plurality of channels based on a minimized interference calculation where the minimized interference calculation is based on an aggregate interference that the WSD received from all other devices using the same channel within range of the WSD and the aggregate interference that the WSD causes to all other devices using the same channel within range of the WSD, and assign the channel to the WSD.

Yet another embodiment of the present disclosure can entail a method at a control station in communication with at least one white space device where the method can include the steps of locating the at least one white spaces device (WSD) within a predetermined area, determining an acceptable channel assignment among a plurality of channels based on a minimized interference calculation where the minimized interference calculation is based on an aggregate interference that the WSD received from all other devices using the same channel within range of the WSD and the aggregate interference that the WSD causes to all other devices using the same channel within range of the WSD, and assign the channel to the WSD.

User devices using "White Spaces" must coordinate channel assignments to minimize mutual interference. This requirement is in addition to any requirement to avoid interference to licensed users. However, the requirement for positive control presents an opportunity to do more than just protect broadcasters. Specifically, there is an opportunity simultaneously to coordinate the channel allocations used by unlicensed white space devices. Hence, the embodiments herein can increase the efficiency of the white space devices by managing the white space device channel allocations. Examples of these management steps include: (a) ensuring that nearby devices use different frequencies, time slots, orthogonal codes, etc. and/or (b) scheduling transmissions to avoid collisions. Note that the embodiments herein are also applicable to licensed or unlicensed spectrum provided a control channel and some position information is available.

Referring to FIG. 1, a communication system or network 100 can include a collection of devices 102 such as the white spaces devices (WSDs). Typically, they will form a geographic cluster such that they potentially interfere with each other. Such a cluster will be called a "service area" 105. However, this need not be the case because, as will be seen below, the process of finding assignments that minimize interference will in effect ignore devices that do not have the potential for mutual interference.

Second, spectrum is divided into "channels" 110. Channels may be frequency bands, time slots, hopping sequences or orthogonal codes or any combination thereof. Devices assigned to the same channel interfere with each other. The amount of interference depends among other things on the distance between the WSDs in question, the gains of the transmitting and receiving antennas and the transmitter power. The WSDs 102 may communicate over bearer channels 110 through a base station 112 and on an operator's network 114.

In addition to this so-called co-channel interference, there may also be adjacent channel interference, which again depends on the distance between the devices, gains and transmit powers in addition to the frequency assignments.

Third, the devices also have access to a so-called "control channel" 104. The control channel 104 has high availability and reliability (e.g., a low error rate), but its information rate can be low because it is only generally used to communicate location and frequency assignment information.

The control channel may be:

A separate physical RF channel operating on another frequency.

A designated channel on a white space frequency that is known a priori to be available.

A designated sub-carrier of a broadcast TV station.

A separate communication channel, for example using a land line.

Fourth, the control channel communicates with a control station (CS) 106. The control station 106:

1. Is used to download geolocation data to WSDs from a geolocation database 108

2. Sends information to each WSD telling it which channel to use.

3. May incorporate a multilateration capability, such as the use of Time Difference of arrival (TDOA).

It is desirable but not required that all the devices in a service area use a control channel. If they all use a control channel, it again is desirable but not required that they communicate with the same CS 106.

FIG. 1 depicts an exemplary embodiment of a WSD 102 in further detail. The WSD can comprise a wireline and/or wireless transceiver 120 (herein transceiver 120), a user interface (UI) 126, a power supply 136, a location receiver 124, and a controller 122 for managing operations thereof. The transceiver 120 can optionally support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 120 can also be adapted to support circuit-switched wireline access technologies (such as PSTN), packet-switched wireline access technologies (such as TCPIP, VoIP, etc.), and combinations thereof.

The UI 126 can include a depressible or touch-sensitive keypad 128 with a navigation mechanism such as a roller ball, joystick, mouse, or navigation disk for manipulating operations of the communication device 102. The keypad 128 can represent a numeric dialing keypad commonly used by phones, and/or a keypad with alphanumeric keys. The UI 126 can further include a display 130 such as monochrome or color LCD (Liquid Crystal Display), OLED (Organic Light Emitting Diode) or other suitable display technology for conveying images to an end user of the communication device 102. In an embodiment where the display 130 is touch-sensitive, a portion or all of the keypad 128 can be presented by way of the display.

The UI 126 can also include an audio system 132 that utilizes common audio technology for conveying low volume audio (such as audio heard only in the proximity of a human ear) and high volume audio (such as speakerphone for hands free operation). The audio system 132 can further include a microphone for receiving audible signals of an end user. The audio system 132 can also be used for voice recognition applications. The UI 126 can further include an image system 134 such as a charged coupled device (CCD) camera for capturing still or moving images.

The power supply 136 can utilize common power management technologies such as replaceable and rechargeable batteries, supply regulation technologies, and charging system technologies for supplying energy to the components of the communication device 102 to facilitate long-range or short-range portable applications. The location receiver 124 can utilize common location technology such as a global positioning system (GPS) receiver for identifying a location of the communication device 102 based on signals generated by a constellation of GPS satellites, thereby facilitating common location services such as navigation or other geolocation technologies can be used. For example, the communication device 102 can use the transceiver 120 to also determine a proximity to a cellular, WiFi or Bluetooth access point by common power sensing techniques such as utilizing a received signal strength indicator (RSSI) and/or a signal time of arrival (TOA) or time of flight (TOF). The controller 122 can utilize computing technologies such as a microprocessor, a digital signal processor (DSP), and/or a video processor with associated storage memory such a Flash, ROM, RAM, SRAM, DRAM or other storage technologies.

The system described above operates in general as follows:
1. White space devices 102 report their positions to the control station over the control channel 104.
2. The control station 106
   a. Determines which channels are available to each user device (102) based on the geolocation database 108.
   b. Estimates the mutual interference; and
   c. Finds an assignment that minimizes the interference subject to the channel availability
3. Assignments are sent back to the user devices (102).
4. Assignments are updated when
   a. A new device joins or leaves the network 100,
   b. A device moves more than a pre-specified distance, or
   c. A preset period of time has passed These elements discussed in more detail below.

Operationally, the control station 106 needs to know at least the approximate location of the devices 102 in order to coordinate channel assignments. As noted above, the white space rules require the location of WSDs to be determined within an accuracy tolerance such as 50 meters. Location can be determined in any of several ways, including the following:

By the device, using either GPS or assisted GPS

By the device, using any distance measurement technique followed by multilateration. As used here, multilateration is any method of determining position by measuring the absolute or relative distance to a number of known points and applying the laws of trigonometry.

By the CS, using any method that can interrogate a WSD, receive a response that can be interpreted as a distance at several locations, followed by multilateration.

For fixed devices, the location may also be determined at the time of installation by the installer and reported to a geolocation database.

However location is determined, a device must be able receive and reply to a location request by a control station. It must also be able to initiate a request in the cases listed below. Both the interrogation and the response use the control channel. The CS and WSD will also need to use other messages to, for example, authenticate themselves to each other and for roaming. Such messages are well understood by those knowledgeable in the field of wireless communications and will not be dealt with further here. The response should include at a minimum:

A unique identifier (such as an ESN or MAC address),

An identified of the channels or channels currently being used by the WSD (not counting the control channel), and The WSD's position. Or, in the case of a fixed device, an identifier of the geolocation database that lists its position Optionally, the response can contain other information such as:

The transmit power being used by the WSD

A measurement of the noise and interference (e.g., a BER) being experienced by the WSD As noted above, the WSD must use the control channel to request a channel assignment in the following situations:
1. A new device joins or leaves the network,
2. An active device moves from one service area to another,
3. An active device needs to add or reduce capacity by adding or dropping a channel,
4. A device moves more than a pre-specified distance, or
5. A set period of time has passed without any other interaction with the CS.

The following are some considerations in implementing the Control Channel 104. As already noted, there are several alternative ways to implement the control channel. Because of the need for high availability and reliability, the preferred implementation is to use a separate channel that is not subject to any of the restrictions of the white spaces themselves. This can be either an entirely separate frequency or, for a fixed WSD, some kind of wireline connection.

If a separate frequency is used, it would preferably be licensed rather than unlicensed to limit the amount of interference. Such a licensed service is the so-called M-LMS ("Multilateration Location and Monitoring Service"). M-LMS operates in the 902-928 MHz band and is allowed to use much higher power than an unlicensed device. However, it is intended for relatively low throughput applications including the communication of location information.

The Control Station 106 fulfills several functions. First, the CS 106 is responsible for ensuring that the devices under its control do not interfere with licensed operators. A small number of unlicensed so-called "incumbents," such as wireless microphones used in theatrical and sporting events, also use the TV broadcast frequencies in the 500-700 MHz band. To the extent that their location is known in advance, they are also included in the geolocation database and are treated no differently from licensed devices. To do this, as already noted, it needs to keep track of device locations and interact with a geolocation database 108. The geolocation database 108 contains information on which licensed devices in which areas are in operation. (Singh [2008a] and [2008b] describe a preferred method of control station operation, using a control channel.)

Figure 2:
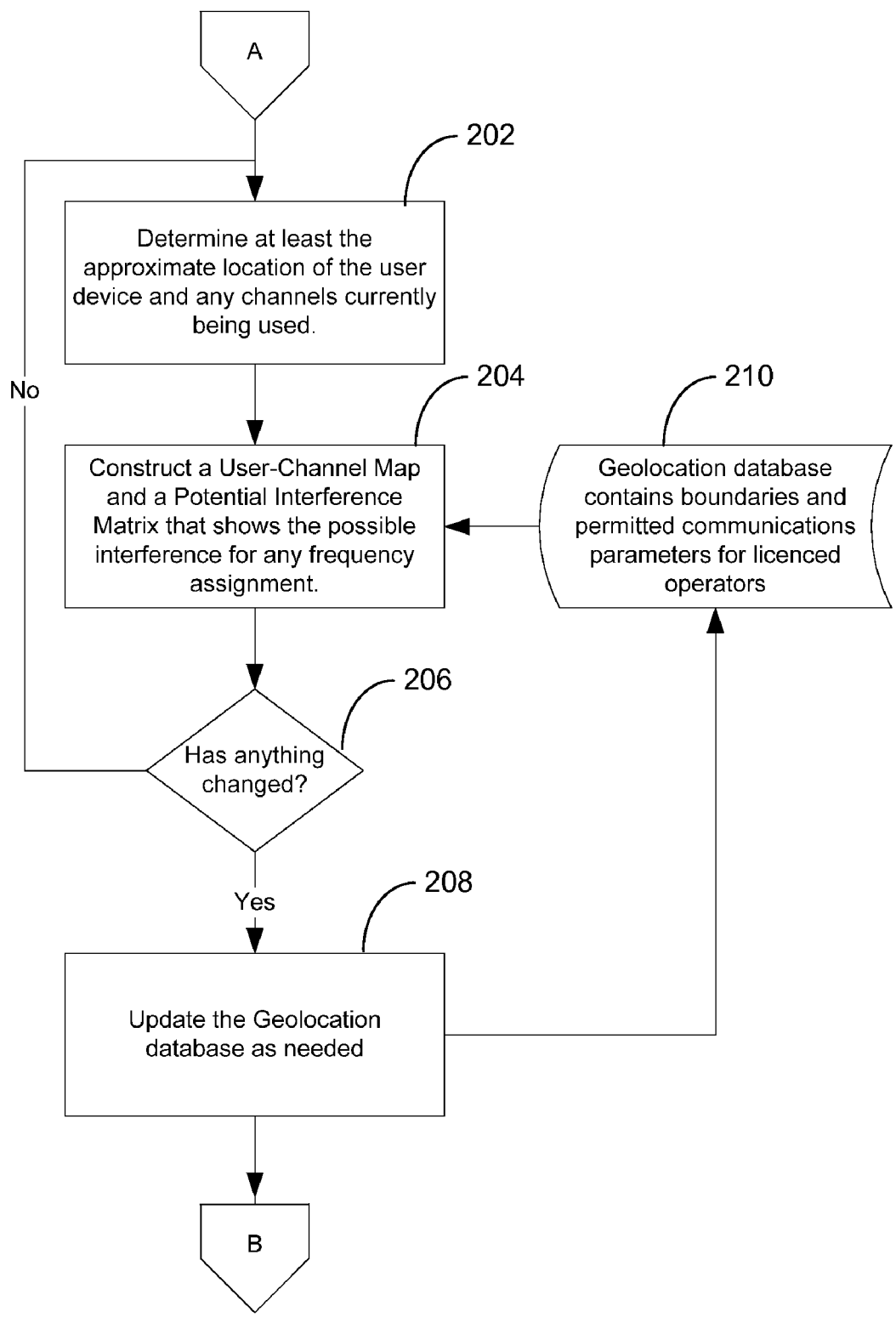
FIG. 2 depicts an illustrative embodiment of a method operating in portions of the communication system of FIG. 1 providing for a control station database maintenance loop.

Second, the CS needs to determine good channel assignments for the devices that it is in contact with, and send commands to them to use these assignments. The process described in FIG. 2 and FIG. 3 combines these two functions. FIG. 2 depicts the loop of a method 200 used when no channel assignments need to be made. The method 200 at 202 can determine at least the approximate location of the user device (102) and any channels currently being used. The method can further construct a User Channel Map and a Potential Interference Matrix (See FIG. 5) that shows the possible interference for any frequency assignment at 204. In this case, the CS 106 monitors the control channel 104 until it receives a request for an assignment from a device. Receipt of a request is indicated in the FIG. 2 by the decision block 206 labeled "has anything changed?" If something did change (channel assignments, change in location, addition or removal of devices in the network, etc.), then the Geolocation database can be updated as needed at 208. The geolocation database can define or contains boundaries and permitted communications parameters for licensed operators at 210 that is used for the User-Channel Map at 204.

Figure 3:
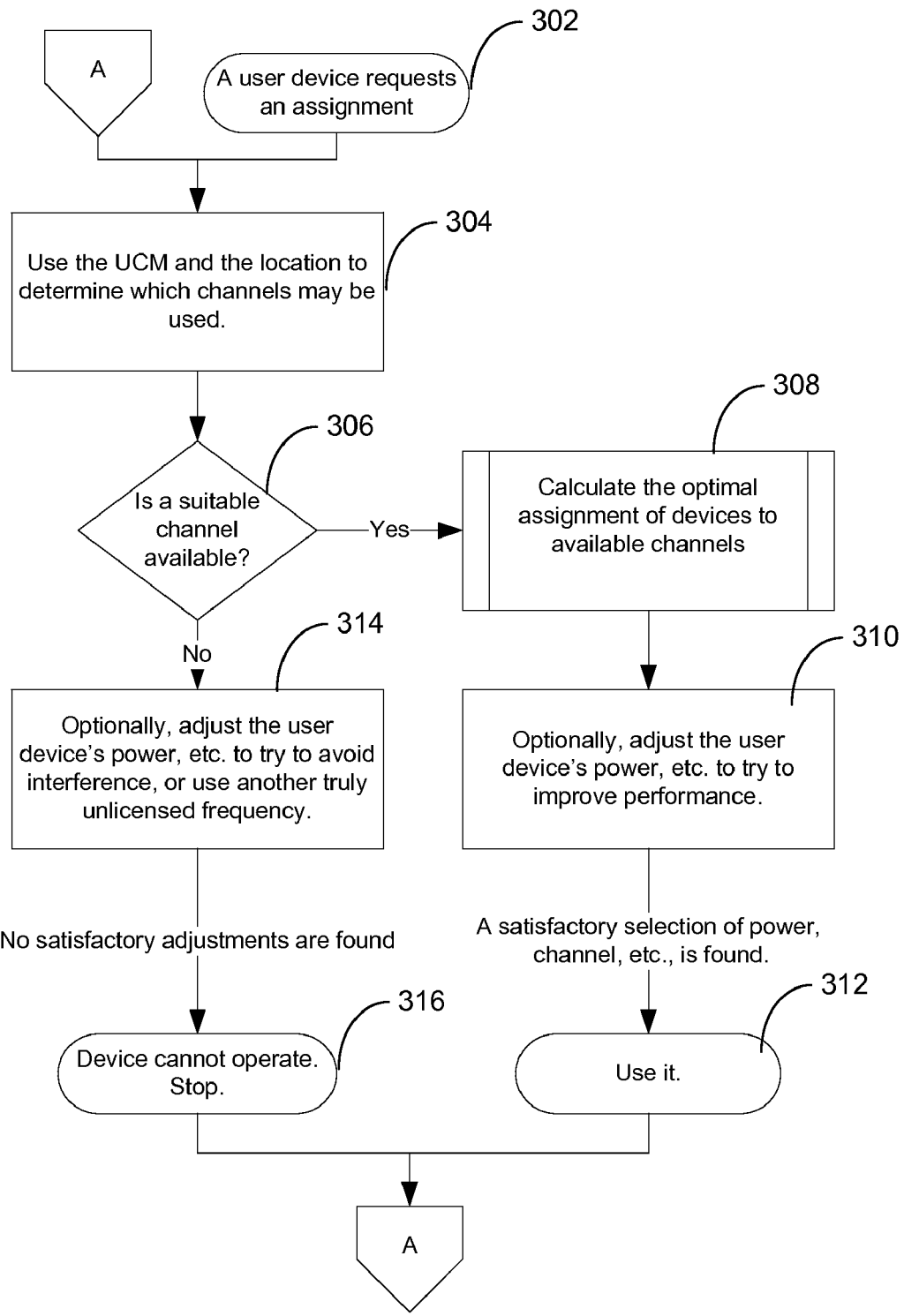
FIG. 3 depicts an illustrative embodiment of a method operating in portions of the communication system of FIG. 1 providing for a control station channel assignment loop.

FIG. 3 shows what happens when a CS 106 receives a channel assignment request at 302 with a method 300. The first step is to determine if it is possible to make an assignment without violating one of the taboos in the geolocation database at 304. If no suitable channel is available at decision block 306, the CS 106 can optionally try several alternatives at 314. One alternative, which is not permitted in all cases, is to reduce the WSD's transmit power or EIRP to a lower level. The other alternative is to use another, truly unlicensed frequency. For example, the 902-928 MHz band is an unlicensed band in the United States. WSDs might carry transmitters and receivers that can use this band in addition to the 500-700 MHz band. Although the 902-928 MHz may have high levels of interference, this alternative is better than not being able to communicate at all. If no alternatives are suitable, then the attempts at adjusting to enable a channel assignment(s) are stopped at 316.

Notice that this first step does not consider the location or channel assignment of any WSD except the one that made the channel assignment request. If one or more suitable channels is available, then the method finds a channel selection that minimizes the interference at 308, considering all devices. The method at 310 can also attempt to adjust some of the user device parameters (such as transmit power) to improve performance before assignment and use of the channel at 312. A detailed discussion and an algorithm for this are discussed below. For now, the point to bear in mind is that adding, deleting or changing the channel assignment of a device does two things:

1. It affects the aggregate interference that the device receives from all the other devices using the same channel, and
2. It affects the aggregate interference that the device causes to all the other devices using the channel.

An optimal assignment considers both effects for all devices in a service area. This process, and the associated outcome, is not the same as with so-called "distributed" or "cognitive" radio systems. In such systems, each device typically senses the aggregate interference it receives and changes channel, power, and so forth in response. This is equivalent to reacting to only the first type of interference listed above and ignoring the second type. It is well known in other settings, such as highway traffic congestion, that such individually optimal responses can lead to assignments that are globally suboptimal.

Once an assignment is found, it is communicated to the WSD. Note that the fully optimal assignment may involve changes to the assignments of other WSDs. Alternatively, each add, delete or change operation can be considered separately. The algorithm below will allow either option.

The CS operation described above is logical only and can be implemented in several ways. One way is to attach a control station to every wireless bases station, or a subset of wireless base stations. This implementation distributes the processing power needed to many different points. It also minimizes any delays that might arise from a centralized solution. Alternatively, if, for example, the control channel is implemented via a wire line link, it may be more economical to have the control stations' functions carried out by a server or servers in a centralized manner.

One important aspect of the embodiments is finding the assignments that minimize interference. The following is a description of one instance of the optimization problem. In this instance, there are N separate channels with equal capacity and M user devices, randomly scattered in a service area. The indexes i and j are used to denote WSDs and the index n to denote channels.

The potential for interference of device i by device j is $d_{ij}$ to the $d_{ji}$. Without loss of generality, we can take $d_{ii}=0$ $d_{jj}=0$ and $d_{ij} \geq 0$ for $i \neq j$. In FIG. 2, this is called the Potential Interference Matrix. A few examples will illustrate the physical meaning of the $d_{ij}$.

Example 1

Protocol Model

In both examples, let $r_{ij}$ denote the Euclidean distance between a pair of devices. Following Gupta and Kumar [2000], the first example might called a "protocol model." In this case:

$$d_{ij} = \begin{cases} 1 & \text{if } r_{ij} \leq \Delta \\ 0 & \text{if } r_{ij} > \Delta \end{cases}$$

Where $\Delta$ represents the minimum desired separation between devices.

Example 2

Interference Model

In the second case, the "interference model," device i has transmit power $P_i$, directional antenna gain $G_{ij}$ and $d_{ij}=P_iG_{ij}r_{ij}^{-\alpha}$ to the $d_{ji}=P_iG_{ij}r_{ij}^{-\alpha}$, where $\alpha \geq 2$. (As used here, for simplicity, the factor $G_{ij}$ includes both the transmit and receive antenna gains.) That is, $d_{ij}$ is the power received by device j from device i when propagation follows a pure power law model with exponent $\alpha$. (See Rappaport [2002] for a survey of the various values of $\alpha$ and the conditions in which different values apply.)

Notice that in Example 1 we have $d_{ij}=d_{ji}$ to the $d_{ij}=d_{ji}$ but this need not be the case in general. Example 2 illustrates this.

The examples above are just two of many ways to treat the potential interference. For example, Aardal et al. (2007) suggest an extension of Example 1 in which the penalties $d_{ij}$ take multiple decreasing values as the distance $r_{ij}$ increases beyond successive thresholds.

In principle, if the devices were suitably equipped, each device could sample each channel and measure the interference. The devices then could report their measurements and channel assignments to the control station, which estimates the $d_{ij}$ by least squares. In practice, this measurement process might take considerable time. It can be shown that the number of measurements by each device needed to identify all the coefficients is asymptotically proportional to M/N. The constant of proportionality increases with the desired measurement accuracy. Using such measurements is apparently the intent of Borras-Chia, et al. (2004, U.S. Pat. No. 6,832,074), although they do not say how they intend to process their measurements. If all the devices are fixed, however, it may be practical.

Formulation as a 0-1 Quadratic Program

If devices i and j are both assigned to channel n the interference from i into j is $d_{ij}x_{in}x_{jn}$ to the $d_{ij}x_{in}x_{jn}$ where $$x_{in} = \begin{cases} 1 & \text{if device } i \text{ is assigned to channel } n \\ 0 & \text{otherwise} \end{cases}$$

In order to guarantee that every user device is assigned t so some channel, add the constraint:

$$\sum_n x_{in} = 1$$

(Although the summations are written $$\sum_i \cdot \sum_n$$

and so forth, those familiar with the art will understand that the summation may be over all devices or channels, or may selectively skip certain assignments if they are known a priori to be prohibited)

Those familiar with the art will see that we could generalize this constraint, without changing the development below, by assuming that each user device has differing requirements for communications capacity. Let $m_i$ to the $m_i$ be the number of channels required by device i. Then the constraint above is replaced by:

$$\sum_n x_{in} = m_i$$

An assignment that minimizes the total interference would therefore solve the following optimization problem:

$$\min J = \sum_n \sum_j \sum_i d_{ij} x_{in} x_{jn}$$

$$s.t. \sum_n x_{in} = 1$$

$$\forall\, i = 1, 2, \ldots, M$$

$$x_{in} \in \{0, 1\}$$

This problem is a version of the Quadratic Assignment Problem (QAP) (Koopmans and Beckmann [1957]) with two simplifications:
1. The so-called commodity flow matrix of the QAP is an identity matrix.
2. Although each device can occupy only one channel, there are no limits on how many devices can share a channel.

The QAP in its general form is NP hard. (See Burkhard et al. [2009] for discussion.) It is not known if these simplifications make it easier to find a global optimum. However, the method below has been found to lead to very good solutions that greatly improve over a random assignment.

The possibility of adjacent channel interference can be taken into account by using a version of the QAP. In this case the "cost" of assigning device i to channel n and device j to channel m is $d_{ijnm} x_{in} x_{jm}$ to the $d_{ijnm} x_{in} x_{jm}$. For the case of strictly adjacent channels, $d_{ijnm} \geq 0$ to the $d_{ijnm} \geq 0$ if and only if m=n−1 or n+1. m=n−1, n or n+1. (Typically $d_{ijnm} \gg d_{ijnm}$ to the $d_{ijnm} \gg d_{ijnm}$ also.)

Lower Bound

A lower bound on the 0-1 QAP can be obtained by replacing the constraints $x_{in} \in \{0,1\}$ with $0 \leq x_{in} \leq 1$. This relaxation is not unreasonable; interpret values of $x_{in}$ between zero and one as probabilities and make the assignment randomly. For instance, if $x_{in}=p$ to the $x_{in}=p$ to the $x_{in}=p$ and $x_{in'}=1-p$ to the $x_{in'}=1-p$ then device i could be assigned to channel n with probability p and to channel n' with probability 1−p.

This constrained quadratic programming problem can be solved by a variety of standard methods. Here we focus on the first and second order conditions for a local optimum and the associated Lagrange multipliers, which have an economic interpretation and motivate a heuristic solution algorithm. The Lagrangian associated with this relaxed problem is:

$$L = \sum_n \sum_j \sum_i d_{ij} x_{in} x_{jn} + \sum_i \lambda_i \left( \sum_n x_{in} - 1 \right) + \sum_i \sum_n u_{in} x_{in}$$

where $\lambda_n$ and $\mu_{in}$ are Lagrange multipliers. In addition to requiring $0 \leq x_{in} \leq 1$ to the $0 \leq x_{in} \leq 1$, the first order (necessary) condition is:

$$0 = \sum_j d_{ji} x_{jn} + \sum_j d_{ij} x_{jn} + \lambda_i + \mu_{in}$$

for $i = 1, 2, \ldots, M$ and $n = 1, 2, \ldots, N$ where $\sum_j d_{ji} x_{jn}$ indicates interference to i by all others on channel n and $$\sum_j d_{ij} x_{jn}$$

indicates interference by I to all others on channel n.

As indicated by the notes below this equation, the incremental change of assigning device i to channel n has the two elements aforementioned:
1. The aggregate interference that device $i^i$ receives from all the other devices using channel n, and
2. The aggregate interference that device i causes to all the other devices using channel n.

The first element is the direct impact on device i. The second element is the indirect impact or what economists call the "externality."

Also, by complementary slackness:

$\mu_{in} \geq 0$ if $x_{in}=0$ $\mu_{in}=0$ if $x_{in} \geq 0$

Furthermore, the second order (sufficient) condition is:

$(d_{ij}+d_{ji})\delta_{nm} \geq 0$ where $\delta_{nm}$ is the Kronecker delta function. It will be satisfied because $d_{ij} \geq 0$ $d_{ij} \geq 0$ by assumption.

Solution Algorithm

Suppose we have a feasible solution to the 0-1 integer problem, say $x_{in}^k$. (The index k will be used below.) Such a feasible solution is always possible because, for example, we can start with any random assignment.

Of course, this solution is also a feasible solution to the relaxed problem. By complementary slackness for the relaxed problem, we know that:

$\lambda_i^k = -(u_{i,n^*(i)}^k + w_{i,n^*(i)}^k)$ where $$u_{in}^k = \sum_j d_{ji} x_{in}^k \text{ to the } u_{in}^k = \sum_j d_{ji} x_{in}^k$$

and
$n^*(i)=\text{argmin}_n (u_{i1}^k+w_{i1}^k, u_{i2}^k+w_{i2}^k, \ldots, u_{iN}^k+w_{iN}^k)$ is the channel that user device i is assigned, i.e., $x_{i,n^*(i)}^k=1$ to the $x_{i,n^*(i)}^k=1$. The multipliers can be used to determine descent directions to this problem.

Just as in the relaxed problem, let us use the multipliers to price out possible improvements. The resulting algorithm is similar to the well-known Hungarian algorithm for the linear assignment problem. (See Kuhn [1955].)
1. Set k=1 and select a feasible solution $x_{in}$ by any satisfactory means.
2. For every channel available to this device (if a Tabu search procedure is used (Glover [1990]) some channels may not be included in the search to avoid cycling), calculate the "reduced cost"

$$c_{in}^k = u_{in}^k + w_{in}^k + \lambda_i^k$$
$$= \sum_j (d_{ij} + d_{ji})x_{jn}^k - \sum_j (d_{ij} + d_{ji})x_{in*(i)}^k$$

(Note that $c_{i,n*(i)}^k = 0$ to the $c_{i,n*(i)}^k = 0$)

3. If all the reduced costs are non-negative, no local improvement can be made. Stop.
4. However, if there are negative reduced costs choose the available channel and device with the lowest (most negative) reduced cost. Call that device $j^k$. Tentatively reassign device $j^k$ to channel $n*(j^k)$ to the $n-(j^k)$. If this reassignment leads to a sufficient improvement (in a Tubu search, the criterion for a sufficient improvement might actually allow a small increase in the objective function) in the 0-1 problem, accept the reassignment. (That is, update the matrix elements $x_{in}^k$ to the $x_{ij}^k$.)
5. If the tentative reassignment does not provide a sufficient improvement, repeat step 3 with the next most negative reduced cost.
6. Once an assignment that leads to a sufficient improvement is found, set k=k+1 to the k=k+1 to the k=k+1, and go to step 2.
7. If no assignment can be found with an improvement, stop.

Steps 1-7 may be repeated a multiplicity of times with different random initial assignments. The best resulting assignment is then used. Again, there are many alternative approaches to managing this repetitive search. Tabu Search (surveyed in Glover [1990]) is one such method and has been successfully implemented by the inventor.

With respect to an economic interpretation herein, the quantity $$w_{in} = \sum_j d_{ij}x_{jn} \text{ to the } w_{in} = \sum_j d_{ij}x_{jn}$$

measures the cost imposed on device i by all the other devices that are assigned to channel n. The quantity $$u_{in} = \sum_j d_{ji}x_{jn}$$

to the $$u_{in} = \sum_j d_{ji}x_{jn}$$

measures the costs that device i imposes on all the others. The $u_{in}$ are sometimes calls external costs because each individual ignores them in making its own channel selection. For example, if each device has a sensor that measures the interference in the channel, the sensor would only detect $u_{in}$ $u_{in}$, not $u_{in}$ $u_{in}$ $u_{in}$ $u_{in'}$.

The assignments developed by so-called cognitive radios, which use such measurements, are the privately optimal solutions. They are what results if every device tries to minimize the interference it sees without taking the external costs into account. They are generally sub-optimal overall.

The optimal solution requires each device to consider both types of cost, i.e., $w_{in}+u_{in}$. In the relaxed problem, the Lagrange multipliers have their familiar interpretation as the marginal cost of having device i in the solution. At a relaxed problem's optimum, we know that $$\lambda_i = (u_{in-(i)} + w_{in-(i)}).$$

The reduced cost matrix calculated in step 1 above measures the possible improvement in the total solution by changing a single assignment. Following the interpretation of $w_{in}+u_{in}$ as a marginal cost, we look for the biggest improvement, i.e., the most negative value of $w_{in}+u_{in}-u_{in-(i)}-W_{in-(i)}$.

Figure 4:
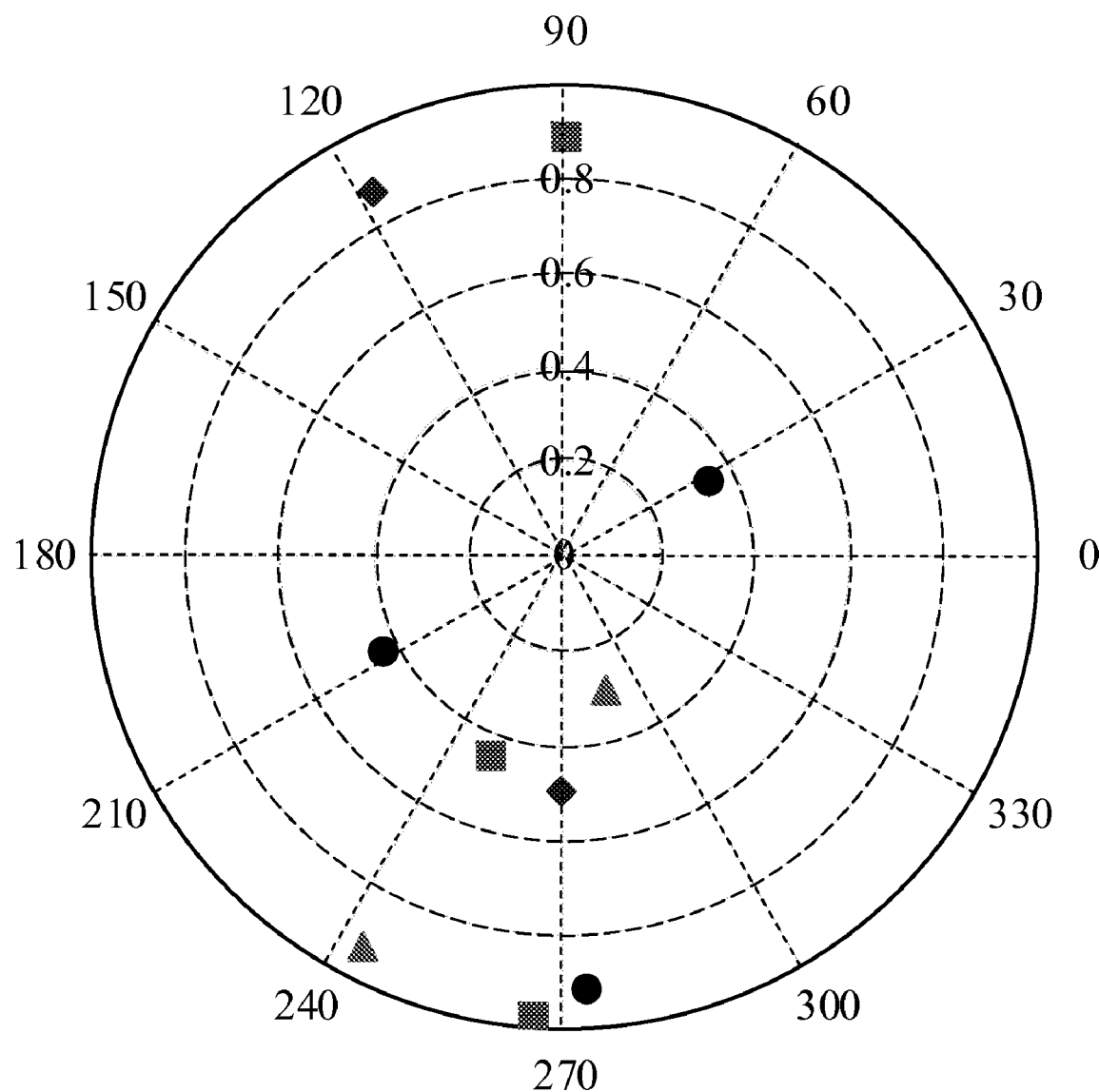
FIG. 4 is a diagrammatic representation of a machine in the form of a computer system within which a set of instructions, when executed, may cause the machine to perform any one or more of the methodologies discussed herein.

FIG. 4 shows an example 400 of the results of this algorithm. This example has four channels and ten devices. The elements of the potential interference matrix 400 were calculated as in Example 2 above, i.e., the interference model. The example took $d_{ij}=r_{ij}^{-\alpha}$ to the $d_{ij}=r_{ij}^{-\alpha}$ where $\alpha \approx 3.5$. That is, all the device powers were assumed the same and the devices had omnidirectional antennas. The ten devices were randomly located in a circle of radius one kilometer.

As can be seen from FIG. 4, the optimal solution spreads devices assigned to the same channel farther apart. Overall, the average of the total path losses per channel is –112 dB. For comparison, an average of 100 random assignments had a value of –100 dB. That is, in this example coordination would reduce the interference by an average of 12 dB.

Further Monte Carlo simulations using up to 96 devices and 16 channels have shown that the average improvement over a random assignment is average improvement is 30 to 40 dB. That is, if the average interference from a collection of devices randomly assigned to a group of channels is, say, –80 dBm, then after optimization the predicted average is 30-40 dB less, i.e., –110 to –120 dBm.

Dynamically coordinating the devices should give especially large savings in cases of interest to white space device operators. If there are few WSDs there will be very little advantage because almost any assignment will be adequate. Conversely, if the spectrum is extremely congested the advantage may not be sufficient to allow more devices to operate. In between these two extreme conditions, however, which characterize normal operating conditions, there should be a significant advantage.

The embodiments herein are different from, but complementary to, other approaches to managing white space spectrum that limit themselves to avoiding interference to licensed devices. For example, the patent applications by Singh (2008).

As already noted, the embodiments herein differ from proposals for distributed radios that use spectrum sensing, because it takes into account ("internalizes") the interference caused by each device to every other device.

One technique as discussed in Borras-Chia, et al., (2004, U.S. Pat. No. 6,832,074) appears to have an algorithm that assigns transmitters to channels in a licensed context so as to minimize the sum of the aggregate interference. Their method collects measurements from the network and estimates the interference levels by means that are unspecified. This is different from the embodiments herein, which rely at least in part on the devices' position information. Their approach is different from the proposed embodiments for several reasons. First, Borras-Chia relies on measurements rather than a combination of location data and a propagation model and secondly, the techniques in Borras-Chia is directed towards licensed devices and may not be practical for unlicensed devices. The measurement process in Borras-Chia would obviously take more time as the number of devices increases and further requires that the devices interrupt on command what they are doing to transmit on different channels in succession. Furthermore, Borras-Chia also appears to require that nothing change during the measurements. For example, the devices cannot move, adjust their power and so forth, which is unrealistic for unlicensed spectrum devices. Additionally, for truly unlicensed spectrum, all channel assignments (the $x_{in}$) may not be known.

The frequency assignment problem is not new, and neither is its connection to integer programming. (For surveys, see Ardal et al. [2007] and the Web site FAP Web or www.zib.de/fap.) However, most of the literature concentrates on different objectives that are more suited to licensed spectrum. For example, there are a number of papers the deal with the problem of minimizing the number of frequencies assigned to a collection of wireless base stations while minimizing interference. The most similar work known to the author of this disclosure is Fischetti, et al., (2000). This paper is concerned with finding a frequency assignment to a set of base stations using as few frequencies as possible, while taking into account the interference from and to all the other base stations through constraints on the allowable $C/(N_0+I)$ to the $C/(N_0+I)$. These authors use a branch-and-cut algorithm to find an optimal solution, not a heuristic such as used here. Their approach is more suitable to licensed assignments, which change very infrequently.

Frequency coordination is usually thought of as a technical or regulatory process to mitigate radio-frequency interference between different radio systems that use the same frequency. See Agnew and Gould [1986] for a description and economic interpretation of the traditional process. The idea of automating it in as discussed in the various embodiments herein is novel and nonobvious since an automated process is typically thought of as being incapable of meeting all the various regulatory and technical requirements that may exist in a particular scenario.

The notion of externalities is known in a non-analogous context. The idea has been applied to highway congestion since Walters (1961). Naor (1969) and Agnew (1976) present centralized and distributed approaches to minimizing congestion in queues and networks of queues. None of these techniques have been applied to communications in any meaningful or known fashion and one of ordinary skill in the art of radio channel assignment would not ordinarily seek to review such art in the area of highway congestion.

The systems and methods disclosed herein are not necessarily limited to white spaces as defined by the FCC or some other regulator. The embodiments presented here are applicable to any multi-channel communications system that requires re-use. All that is needed are location-aware devices, a form of control channel over which they can communicate with a control station, and the ability to change channels on command.

For example, the performance of any unlicensed band can be improved by implementing a control channel and incorporating this invention. (As far as the inventor knows, regulators do not prohibit control channels in unlicensed spectrum—they are just not used.)

The embodiments herein can also be applied in licensed spectrum, such as cellular systems. These systems already have a control channel and the locations of mobile devices are readily available to the operator. However, these systems do not use the location information to minimize interference. For example, in the United States the regulatory requirement for enhanced 911 ("E911") service implies the ability to determine the location of every mobile. However, the focus of E911 capability is on conveying the call and the location information to the emergency responder within whose jurisdiction the caller is located. In addition, the techniques disclosed here can be used in systems using CDMA to mitigate the so-called "near-far" problem. (In this case, the shared channels are quasi-orthogonal codes.)

Finally, the technique, in conjunction with the methods disclosed in the Singh (2008) patent applications, can be used in frequency bands where some users operate on a secondary basis to pother users.

Upon reviewing the aforementioned embodiments, it would be evident to an artisan with ordinary skill in the art that said embodiments can be modified, reduced, or enhanced without departing from the scope and spirit of the claims described below. For example, the embodiments herein that are directed towards unlicensed spectrum devices can also be applied towards licensed spectrum devices.

Other suitable modifications can be applied to the present disclosure without departing from the scope of the claims below. Accordingly, the reader is directed to the claims section for a fuller understanding of the breadth and scope of the present disclosure.

Figure 5:
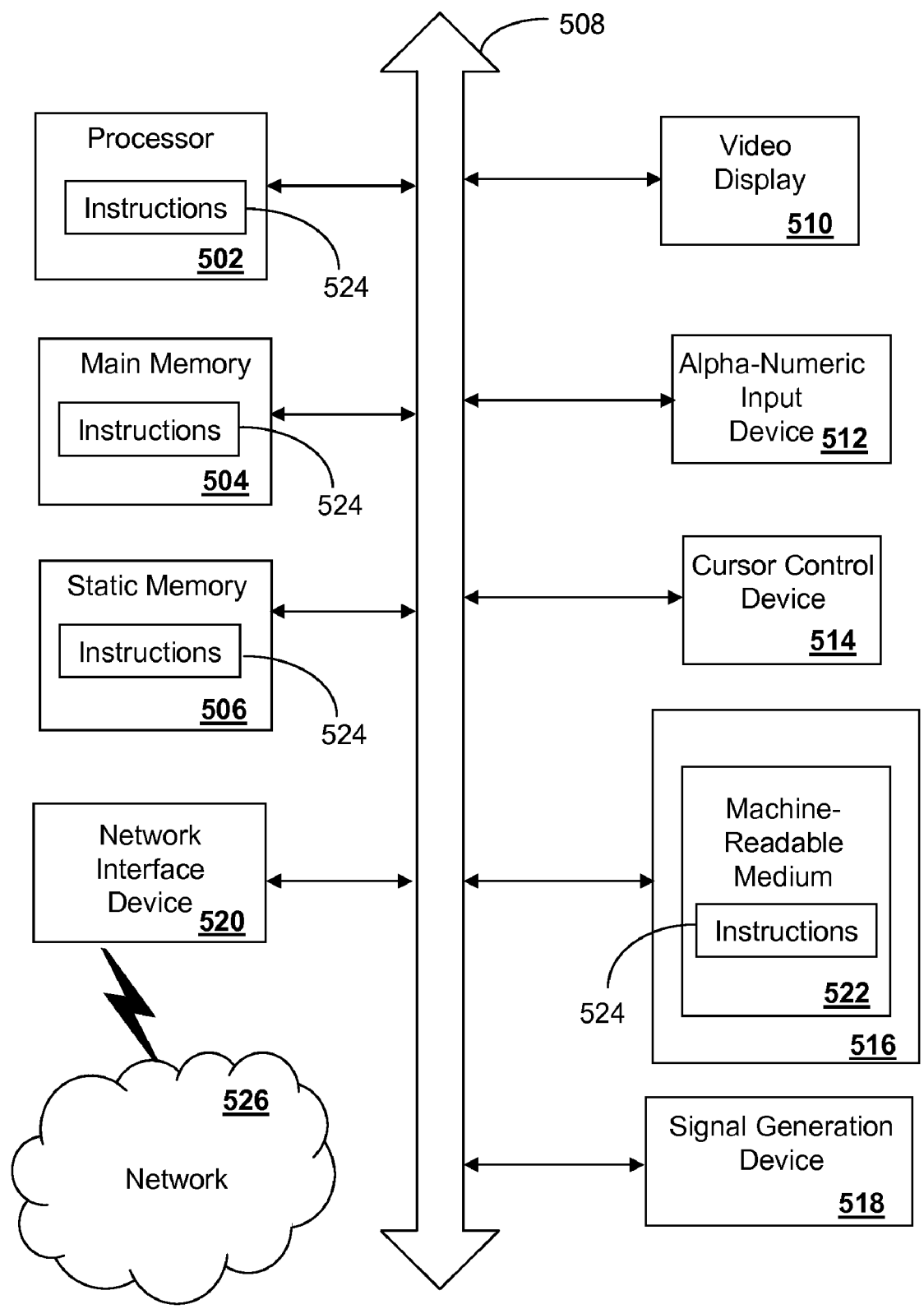
FIG. 5 depicts a potential interference matrix utilized in the communication system of FIG. 1 for the purpose of channel assignment.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid-state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may themselves be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A white spaces device (WSD), comprising:
   a controller configured to:
      send location information to a control station over a control channel with respect to a current location of the WSD;
      receive channels available based on a geolocation database;
      receive a channel assignment based upon the geolocation database and a minimized interference calculation, wherein the minimized interference calculation is based on an aggregate interference that the WSD received from all other devices using the same channel within range of the WSD and the aggregate interference that the WSD causes to all other devices using the same channel within range of the WSD; and
      send to the control station a measurement of noise and interference being experienced by the WSD from all other devices using the same channel within range of the WSD.

2. The white spaces device of claim 1, wherein the controller is programmed to receive updates to the channel assignment when a device enters or leaves a network used by the WSD and at least one among the following events occurs:
   a device moves more than a predetermined distance; or
   a predetermined amount of time lapses.

3. The white spaces device of claim 1, wherein the controller is programmed to send a unique identifier for the WSD.

4. The white spaces device of claim 3, wherein the unique identifier is an Electronic Serial Number.

5. The white spaces device of claim 1, wherein the controller is programmed to send to the control station a list of channels currently being used by the WSD where the WSD is an unlicensed device that is location-aware that operates only with a positive control signal over the control channel.

6. The white spaces device of claim 1, wherein the controller is programmed to send to the control station a transmit power currently being used by the WSD and the controller receives the channel assignment from the control station based upon the geolocation database and a minimized interference calculation.

7. The white spaces device of claim 1, wherein the controller is programmed to request a new channel assignment when at least one among the following occurs:
a new device joins a network used by the WSD;
a new device leaves the network used by the WSD;
an active device moves from one service area to another;
an active device adds capacity by adding a channel;
an active device reduces capacity by dropping a channel;
the WSD moves more than a predetermined distance; and
a set period of time has passed without any other interaction with the control station.

8. A method at a white spaces device (WSD), comprising:
sending a unique identifier for the WSD to a control station over a control channel;
sending location information to the control station over the control channel with respect to a current location of the WSD;
receiving channels available based on a geolocation database;
sending to the control station a measurement of noise and interference being experienced by the WSD; and
receiving a channel assignment based upon the geolocation database and a minimized interference calculation.

9. The method of claim 8, wherein the method requests and receives updates to the channel assignment when at least one among the following events occurs:
a device moves more than a predetermined distance;
a device enters a network used by the WSD;
a device leaves the network used by the WSD; and
a predetermined amount of time lapses.

10. The method of claim 8, wherein the method requests a new channel assignment when at least one among the following occurs:
a new device joins a network used by the WSD;
a new device leaves the network used by the WSD;
an active device moves from one service area to another;
an active device adds capacity by adding a channel;
an active device reduces capacity by dropping a channel;
the WSD moves more than a predetermined distance; and
a set period of time has passed without any other interaction with the control station.

11. The method of claim 8, wherein the method sends to the control station a list of channels currently being used by the WSD.

12. The method of claim 8, wherein the method sends to the control station a transmit power currently being used by the WSD.

13. The method of claim 8, wherein the minimized interference calculation is based on an aggregate interference that the WSD received from all other devices using the same channel within range of the WSD and the aggregate interference that the WSD causes to all other devices using the same channel within range of the WSD.

14. A control station, comprising:
a controller configured to:
locate a white spaces device (WSD) within a predetermined area;
interact with a geolocation database;
request from and receive from the WSD a measurement of noise and interference being experienced by the WSD;
determine an acceptable channel assignment among a plurality of channels based on a minimized interference calculation, wherein the minimized interference calculation is based on an aggregate interference that the WSD received from all other devices using the same channel within range of the WSD and the aggregate interference that the WSD causes to all other devices using the same channel within range of the WSD; and
assign the channel to the WSD.

15. The control station of claim 14, wherein the controller is programmed to request and receive a list of channels currently being used by the WSD.

16. The control station of claim 14, wherein the controller is programmed to request and receive a transmit power currently being used by the WSD, wherein the control station minimizes the aggregate interference resulting from co-channel interference and adjacent channel interference.

17. The control station of claim 14, wherein the control station uses a control channel having a high availability and reliability but low throughput for assigning the channel to the WSD.

18. The control station of claim 14, wherein the controller is programmed to assign a new channel assignment to the WSD when at least one among the following occurs:
a new device joins a network used by the WSD;
a new device leaves the network used by the WSD;
an active device moves from one service area to another;
an active device adds capacity by adding a channel;
an active device reduces capacity by dropping a channel;
the WSD moves more than a predetermined distance; and
a set period of time has passed without any other interaction with the control station.

19. A method at a control station in communication with at least one white space device, comprising:
locating the at least one white spaces device (WSD) within a predetermined area;
determining an acceptable channel assignment among a plurality of channels based on a minimized interference calculation, wherein the minimized interference calculation is based on an aggregate interference that the WSD receives from all other devices using the same channel and the aggregate interference that the WSD causes to all other devices using the same channel; and
assign the channel to the WSD;
wherein the method receives a measurement of noise and interference being experienced by the at least one WSD and performs at least one of the functions of receiving a list of channel currently being used by the at least one WSD or receiving a transmit power currently being used by the at least one WSD.

20. The method of claim 19, wherein the method interacts with a geolocation database.

21. The method of claim 19, wherein method assigns a new channel assignment to the WSD when at least one among the following occurs:
a new device joins a network used by the WSD;
a new device leaves the network used by the WSD;
an active device moves from one service area to another;

an active device adds capacity by adding a channel;
an active device reduces capacity by dropping a channel;
the WSD moves more than a predetermined distance; and
a set period of time has passed without any other interaction with the control station.

22. The method of claim 19, wherein the minimized interference calculation is based on an aggregate interference that the WSD receives from all other devices using the same channel and the aggregate interference that the WSD causes to all other devices using the same channel.

23. The method of claim 19, wherein the minimized interference calculation is determined using a potential interference matrix.

24. The method of claim 19, wherein the method minimizes the total interference received by all WSD as a result of their assignments to various available channels using the potential interference matrix.

25. A non-transitory computer-readable storage medium at a White Space Device, comprising one or more processors and a memory containing computer instructions wherein the one or more processors are configured to:
   send location information to a control station over a control channel with respect to a current location of the WSD;
   receive channels available based on a geolocation database; and
   receive a channel assignment based upon the geolocation database and a minimized interference calculation, wherein the minimized interference calculation is based on an aggregate interference that the WSD received from all other devices using the same channel within range of the WSD and the aggregate interference that the WSD causes to all other devices using the same channel within range of the WSD.

26. A non-transitory computer-readable storage medium at a control station, comprising one or more processors and a memory containing computer instructions wherein the one or more processor are configured to:
   locate a white spaces device (WSD) within a predetermined area;
   interact with a geolocation database;
   determine an acceptable channel assignment among a plurality of channels based on a minimized interference calculation, wherein the minimized interference calculation is based on an aggregate interference that the WSD received from all other devices using the same channel within range of the WSD and the aggregate interference that the WSD causes to all other devices using the same channel within range of the WSD; and
   assign the channel to the WSD.

* * * * *